United States Patent
Salter et al.

(10) Patent No.: US 11,934,202 B2
(45) Date of Patent: Mar. 19, 2024

(54) SYSTEMS AND METHODS FOR SMART CONTAINERS CONFIGURED FOR MOVING GOODS

(71) Applicant: Ford Global Technologies, LLC, Dearborn, MI (US)

(72) Inventors: Stuart Salter, White Lake, MI (US); Peter Phung, Windsor (CA); Adam Carlson, Ann Arbor, MI (US); Benjamin Richer, Detroit, MI (US); Annette Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 575 days.

(21) Appl. No.: 17/171,053

(22) Filed: Feb. 9, 2021

(65) Prior Publication Data
US 2022/0253073 A1    Aug. 11, 2022

(51) Int. Cl.
| G05D 1/02 | (2020.01) |
| G05B 15/02 | (2006.01) |
| G05D 1/00 | (2006.01) |
| G06Q 10/0833 | (2023.01) |

(52) U.S. Cl.
CPC .......... *G05D 1/0291* (2013.01); *G05B 15/02* (2013.01); *G06Q 10/0833* (2013.01)

(58) Field of Classification Search
CPC ... G05D 1/0291; G06Q 10/0833; G05B 15/02
See application file for complete search history.

(56) References Cited

U.S. PATENT DOCUMENTS

| 4,750,197 | A  | * | 6/1988 | Denekamp | ............. | G07C 5/008 |
| | | | | | | 235/375 |
| 10,057,722 | B2 | | 8/2018 | Skaaksrud | | |
| 10,345,818 | B2 | | 7/2019 | Sibley | | |
| 10,431,188 | B1 | * | 10/2019 | Nelson | ................... | G09G 5/363 |
| 11,447,245 | B2 | * | 9/2022 | Neubecker | ............. | B64U 80/70 |
| 2014/0141819 | A1 | * | 5/2014 | Wang | .................. | H04W 12/126 |
| | | | | | | 455/466 |
| 2017/0073085 | A1 | * | 3/2017 | Tremblay | ............. | G08G 5/0069 |

(Continued)

OTHER PUBLICATIONS

Crypto Lee, "Smart Containers—A New Container Technology Set to Disrupt the Logistics Marketplace", https://medum.com, Apr. 30, 2018, 3 pages.

*Primary Examiner* — Michael Collins
(74) *Attorney, Agent, or Firm* — Brandon Hicks; Eversheds Sutherland (US) LLP

(57) ABSTRACT

A smart container for transporting items in transportation vehicles, e.g., an autonomous vehicle (AV), having heating/cooling capabilities, security features, unloading/loading assistance, and/or GPS cellular tracking for positional awareness, and methods of use thereof, are provided. The smart container includes an inductive charging module for receiving power from the vehicle. The container may provide information to facilitate delivery. When the vehicle arrives at a delivery destination, the customer may be provided a map of containers within the vehicle, and a specific container may provide an indication that it is the correct container. The customer may then provide a code to access the container. If a container is improperly removed, an alarm may be triggered and a notification may be provided to a third party.

17 Claims, 4 Drawing Sheets

(56) References Cited

U.S. PATENT DOCUMENTS

| | | | |
|---|---|---|---|
| 2018/0121872 A1* | 5/2018 | Walsh | G06Q 10/08355 |
| 2019/0092612 A1* | 3/2019 | Soder | B66F 9/063 |
| 2019/0287063 A1* | 9/2019 | Skaaksrud | G05D 1/0276 |
| 2020/0017210 A1* | 1/2020 | Neubecker | B64D 1/22 |

* cited by examiner

SYSTEMS AND METHODS FOR SMART CONTAINERS CONFIGURED FOR MOVING GOODS

BACKGROUND

Shipping and tracking items may pose a number of challenges. In particular, shipping containers may be delivered to the wrong location, incorrect recipients may accidentally or willfully retrieve items not meant for them, shipping containers may be tampered with during transit, and/or customers may be unaware of the status of a shipment, including shipment delays, etc. Moreover, for sensitive items that require precise temperature control, current inefficient methods include cooling the entire loading van and/or using the expendable resource of dry ice in an insulated box. It is with respect to these and other considerations that the disclosure made herein is presented.

DETAILED DESCRIPTION

Overview

Figure 1:
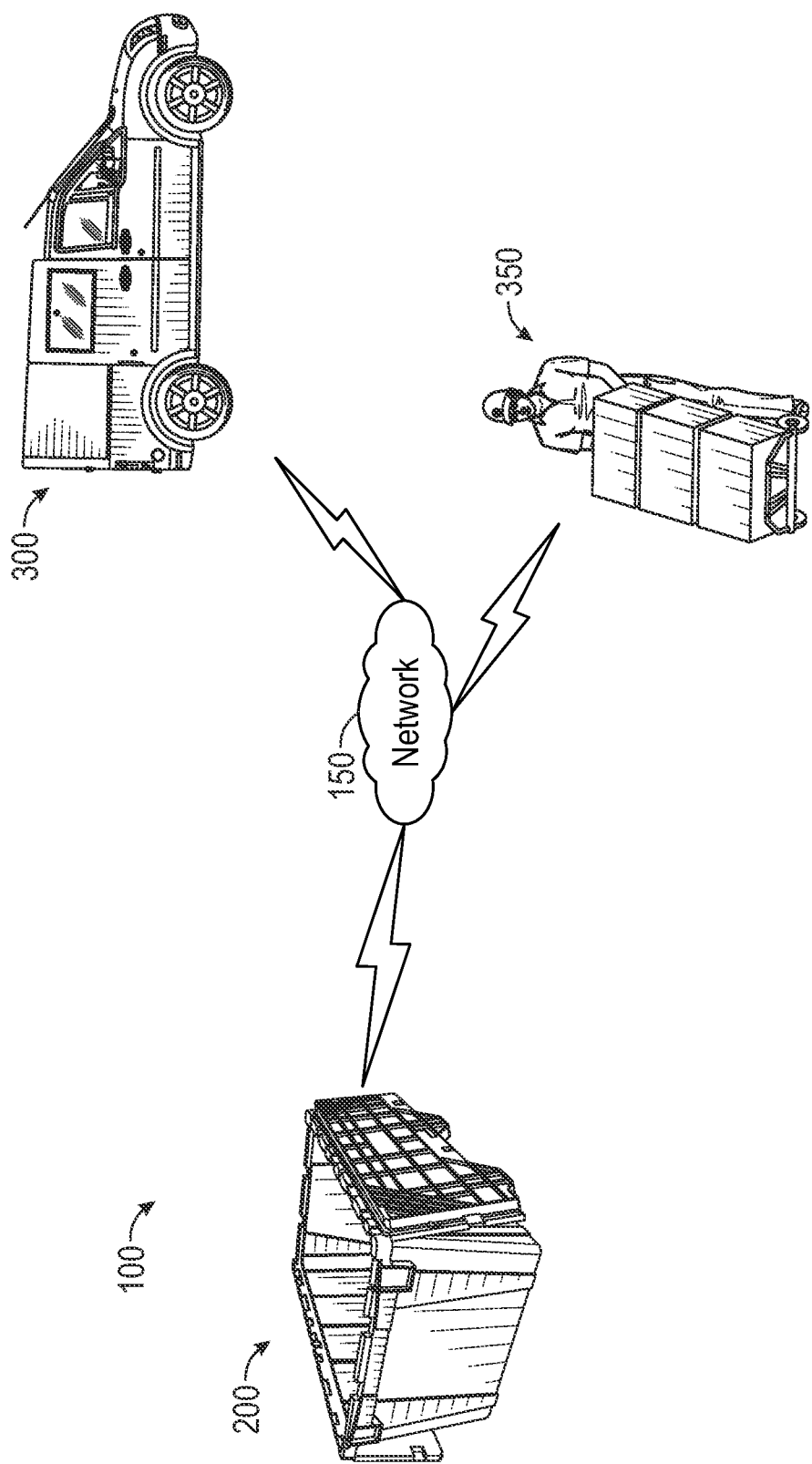
FIG. 1 illustrates a system for delivering items using a smart container in accordance with the principles of the present disclosure.

A smart transportation container for transporting items in transportation vehicles having heating/cooling capabilities, security features, unloading/loading assistance, and/or GPS cellular tracking for positional awareness is provided. The smart container also includes an inductive charging pad that the container may use to receive power from the transportation vehicle. When items are placed inside the container, the container may be programmed via, e.g., Bluetooth Low Energy (BLE), to include customer data, such as name, item being placed within the container, etc. When the lid of the container is closed, a sensor may be used to identify if the lid is tampered with. The container may also be provided with an anticipated trip time and provide an alert when a delivery date/time is missed. The container may also be configured to communicate with the transportation vehicle, e.g., an autonomous vehicle (AV), to provide information such as confirmation that the container is loaded properly, its location, etc. The container may also provide information received from internal sensors, e.g., relating to internal temperature, lid status, charge capacity, etc.

When the delivery vehicle arrives at a delivery destination, the customer receiving the item within a specific container may be provided a map of containers within the vehicle, and a specific container may begin to flash or provide another indication that it is the correct container. The customer may then provide a code to access the container. If a container is improperly removed, an alarm may be triggered and a notification may be provided to a third party.

Accordingly, the smart container described herein provides a means of shipment, storage, and handling in an autonomous vehicle while providing additional tracking/reporting and protection. The smart container provides shipping and receiving parties added functionality such as providing energy and climate control options. The smart container may provide a low cost smart shipping container that may both power itself and receive power from the AV, and may further communicate information to the AV. Thus, the smart container is economical and may be seamlessly integrated for B2B or B2C markets.

Moreover, the smart container may utilize a centralized network with communized UX language using BLE/wifi/cell data, provide real-time information with greater granularity of smart container placement (automatic mapping) within the AV via LED light/BLE triangulation or WiFi mapping, enable finer traceability and security of movement of goods via sensors and AV signal repeater functionality, e.g., immediate report if any wrong smart containers are removed, provide visual indicators using exterior LEDs for customers to identify appropriate goods, and provide localized options for mobility of goods for smaller companies and individuals.

The smart containers further may optimize logistics of goods, reduce resource waste, e.g., missing parcels, smart container reclaims, reusability etc., with active/passive tractability of smart containers, and maximize AV utilization to drive overall costs down by accepting empty smart containers. The smart containers take advantage of AV for providing continuous power through inductive charging pads for climate control goods within the smart container versus traditional methods such as cooling the entire loading van, and/or the expendable resource of dry ice in an insulated box.

In accordance with one aspect of the present disclosure, the smart container may include a body sized and shaped to store one or more items, the body having an opening and a door that may transition between an open position and a closed position. The smart container further may include one or more sensors, an inductive charging module that may be charged via an external charging source and may power the smart container, and communication circuitry for communicating with one or more receivers, e.g. via a Bluetooth connection. In addition, the smart container may include a computing device including a processor and a memory having computer executable instructions that, when executed by the processor, cause the processor to transmit data indicative of smart container information to at least one of the one or more receivers via the communication circuitry to facilitate delivery of the one or more items.

For example, the one of the one or more sensors may include a temperature sensor for measuring temperature within the smart container, and the smart container may further include a temperature control module operatively coupled to the computing device, such that the processor controls temperature within the smart container via the temperature control module based on the temperature measurements and a desired temperature range stored in a memory of the processor. Another one of the sensors may include a door sensor operatively coupled to the door, such that the processor generates an alarm if the door sensor detects that the door is tampered with.

One of the one or more receivers may be integrated with an autonomous vehicle. Accordingly, the processor may transmit data indicative of smart container information, e.g., information that the smart container is properly loaded on the autonomous vehicle, to the autonomous vehicle. Another one of the one or more receivers may be integrated with a customer device. Accordingly, the processor may transmit data indicative of smart container information, e.g., a map including a location of the smart container within a delivery vehicle, to the customer device to facilitate delivery of the one or more items. Additionally or alternatively, the processor may transmit an alert to the customer device indicative of an approaching delivery.

In addition, the processor may receive smart container information including at least one of contents, customer name, delivery location, desired temperature range, anticipated pickup date, or anticipated trip length. The processor further may delete the received smart container information upon receipt of a code via a graphical user interface coupled to the smart container. The smart container further may include a lock for maintaining the door in the closed position when activated. Accordingly, the processor may deactivate the lock upon receipt of an unlock code via a graphical user interface operatively coupled to the smart container.

Moreover, the smart container may include a status indicator for indicating status of the smart container, e.g., a charge level of the smart container, when the inductive charging module is being charged by the external charging source, when the smart container is within a predetermined proximity to a destination, or if the smart container is being removed from a delivery vehicle at an incorrect destination. Additionally, the smart container may include a GPS system for determining a geographical location of the smart container. The smart container further may include a battery for powering the smart container when the inductive charging module is not being charged via the external charging source.

In accordance with another aspect of the present disclosure, a method for delivering one or more items using a smart container is provided. The method may include receiving the one or more items in the smart container; loading the one or more items within the smart container onto a delivery vehicle; charging the smart container via an inductive charging module of the smart container and an external charging source of the delivery vehicle; and transmitting data indicative of smart container information to a receiver to facilitate delivery of the one or more items.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, exemplary system 100 for delivering items using a smart container is provided. As shown in FIG. 1, system 100 may include smart container 200, transportation/delivery vehicle 300, e.g., an autonomous vehicle (AV), and customer device 350, e.g., a user device operated by a customer receiving delivery of the items within smart container 200. Smart container 200 may communicate with delivery vehicle 300 and customer device 350 over network 150 as described in further detail below. Moreover, smart container 200 may communicate with receivers of additional third party devices over network 150, e.g., source/shipping party, destination/receiving party, transit/delivery service, and/or arbitration/ledger services.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, e.g., Bluetooth Low Energy (BLE), cellular, near-field communication (NFC), WiFi, WiFi direct, machine-to-machine communication, man-to-machine communication, and/or visible light communications.

Preferably, smart container 200 communicates with delivery vehicle 300 over a BLE connection, e.g., during transit, and smart container 200 communicates with customer device 350 over a BLE connection when smart container 200 is within a predetermined range of customer device 350; otherwise, smart container 200 may communicate with customer device 350 over another wireless communication link described above, e.g., cellular.

Figure 2:
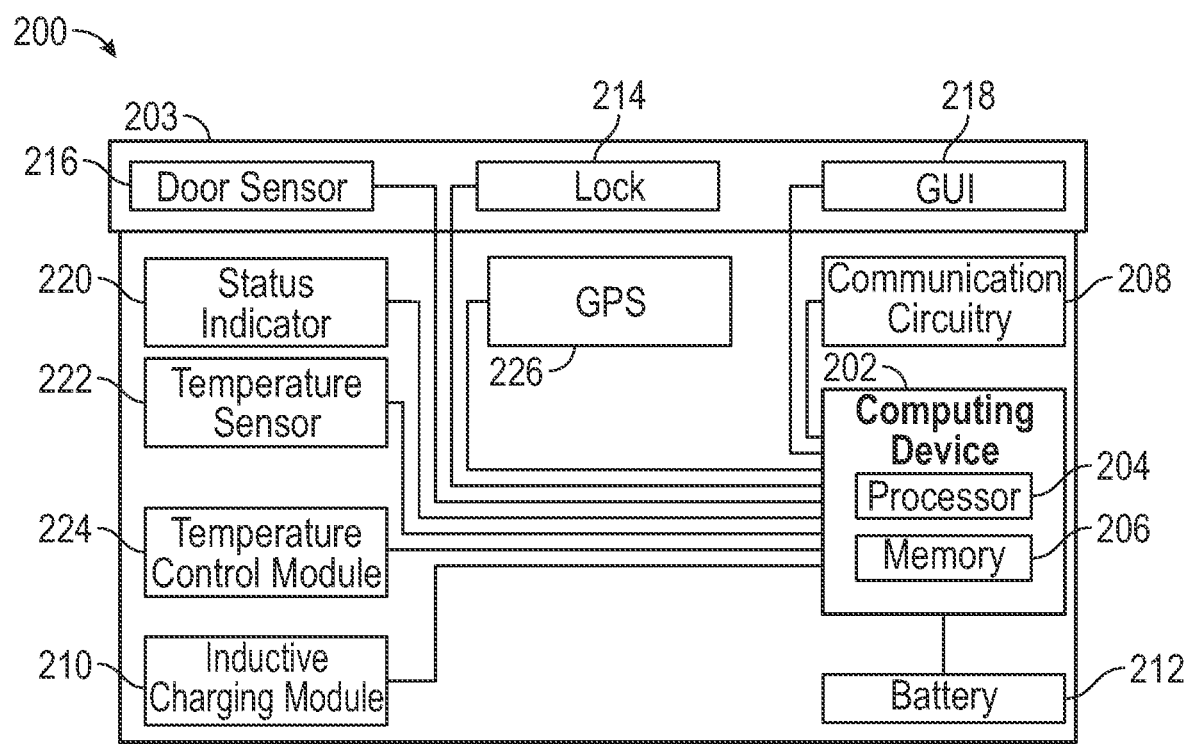
FIG. 2 shows some example components that may be included in a smart container in accordance with the principles of the present disclosure.

Referring now to FIG. 2, smart container 200 is described. As shown in FIG. 2, smart container 200 may include computing device 202 having processor 204 and memory 206, door 203, e.g., a lid, communication circuitry 208, inductive charging module 210, battery 212, lock 214, door sensor 216, graphical user interface (GUI) 218, one or more status indicators 220, temperature sensor 222, temperature control module 224, and/or GPS 226. Computing device 202 may be operatively coupled to the electronic components of smart container 200 as shown in FIG. 2. Communication circuitry 208 is preferably located on door 203 for improved reception, e.g., when smart container 200 is waiting at a pick-up location, e.g., a dock or porch.

Computing device 202 may receive smart container information including, e.g., smart container content(s), customer name, delivery location, desired temperature range, code for deleting smart container memory, anticipated pickup date, and/or anticipated trip length, and may store the smart container information in memory 206. For example, the smart container information may be received upon receipt of the items in smart container 200 by manual input or by using digital information scanning technology well known in the art.

Memory 206, which is one example of a non-transitory computer-readable medium, may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Smart container 200 may be sized and shaped to receive one or more items for delivery, and may be loaded onto delivery vehicle 300 as described in further detail below. Smart container 200 may include inductive charging module 210, e.g., an inductive charging pad, that may be charged via an external charging module, e.g., integrated with vehicle 300, for actively powering the electrical components of smart container 200. Inductive charging module 210 is preferably disposed on the bottom surface of smart container 200, such that it may be charged upon placement atop the external charging module. Inductive charging module 210 may be operatively coupled to battery 212, e.g., a lithium ion battery pack, for charging battery 212, such that battery 212 may power the electrical components of smart container 200 when inductive charging module 210 is not operatively coupled to the external charging module.

Smart container 200 may include an opening for receiving the one or more items, and door 203 for covering the opening. Door 203 may transition between an open position and a closed position. Lock 214 may be activated to maintain door 203 in the closed position. Lock 214 may be operatively coupled to GUI 218, such that upon receipt of a correct unlock key via GUI 218, lock 214 will be deactivated to permit door 203 to transition from the closed positioned to the open position. GUI 218 may be integrated with smart container 200, or optionally may be integrated with, e.g., vehicle 300 or customer device 350. For example, upon proper delivery of smart container 200 to the appropriate destination, a user may input the unlock key via GUI 218, e.g., a key pad on an external surface of smart container 200, a control module of vehicle 300, or a mobile application on customer device 350, which if correct, sends a signal to computing device 202 of smart container 200 to cause lock 214 to deactivate.

In addition, door sensor 216, e.g., an ajar switch, may be integrated into door 203 to detect whether door 203 is in the open or closed position, and may transmit data indicative of the position of door 203 to computing device 202. Accordingly, if data received from door sensor 216 indicates that door 203 is in the open position when door 203 is supposed to be in the closed position, processor 204 may generate an alert indicating that door 203 has been tampered with. Processor 204 may transmit the alert via communication circuitry 208 to a third party, e.g., vehicle 300, customer device 350, and/or the shipper. Alternatively, door sensor 216 may generate and transmit a tampering signal to processor 204 upon detecting of a tampering event.

Status indicator 220 may be, e.g., one or more LEDs that emit a variety of colors, e.g., green, red, amber, yellow, etc., in various patterns, e.g., solid on or blinking/flashing, etc., each color/pattern conveying a unique status of smart container 200. For example, status indicator 220 may indicate a charge level of battery 212, when inductive charging module 210 is being charged by the external charging source, when smart container 200 is within a predetermined proximity to a destination, e.g., as indicated by GPS 226 described in further detail below, and/or if smart container 200 is being removed from delivery vehicle 300 at an incorrect destination.

For example, status indicator 220 may illuminate solid green light to indicate that inductive charging module 210 is being charged by the external charging source, flash amber light when smart container 200 reaches the appropriate destination to indicate which smart container needs to be unloaded from vehicle 300, and/or flash red light if smart container 200 is being unloaded from vehicle 300 at a wrong location.

Moreover, status indicator 220 may flash yellow light to indicate that smart container 200 should be charged, e.g., if power level of battery 212 is below a predetermined threshold, e.g., 80%. Additionally, if the projected power use by smart container 200 before delivery to the appropriate destination exceeds a predetermined threshold, e.g., 80% of the battery life, processor 204 may send an alert/notification via BLE/WiFi of the potential battery depletion during transit to, e.g., vehicle 300. Status indicator 220 may illuminate solid red light to indicate that the power level of battery 212 is below a predetermined threshold, e.g., 20%, such that the user may determine whether to continue transportation of smart container 200, e.g., if no functions of smart container 200 requiring power (heating/cooling) are necessary for the remainder of the delivery route. If additional power is needed, a user may charge smart container 200 via inductive charging module 210 if an external charging source is available, or may transfer the contents of smart container 200 into another empty, charged smart container for the remainder of the delivery route. Accordingly, the status indicator of the empty, charged smart container may illuminate in a pattern corresponding with status indicator 220 of the depleted smart container 200, to visually indicate a potential swap match. As will be understood by a person ordinarily skilled in the art, different predetermined colors/patterns may be used to convey status of smart container 200.

Temperature sensor 222 may be any temperature measurement device known in the art for measuring an internal temperature within smart container 200, and which may generate and transmit data indicative of the measured temperature to computing device 202. Processor 204 may cause temperature control module 224, e.g., Peltier cooler/heater technology, metal heat sinks, and/or thermally conductive plastic, to cool or heat smart container 200 based on the measured temperature by temperature sensor 222 to achieve the desired temperature range associated with the stored items stored in memory 206. Status indicator 220 may illuminate in a specific color/pattern, e.g., blinking green, to indicate that heating/cooling has begun. Accordingly, the walls of smart container 200, including door 203 and the bottom surface of smart container 200, may be insulated.

GPS 226 may generate data indicative of a geographical location of smart container 200, and transmit the data to computing device 202 for positional awareness of smart container 200. As described above, based on the data received from GPS 226 regarding the geographical location of smart container 200, processor 204 may determine whether smart container 200 is in the appropriate destination prior to removal of smart container 200 from vehicle 300, and thus, if smart container 200 is approaching the target destination. Based on this information, processor 204 may cause status indicators 220 to illuminate in specific colors/patterns as described above.

Figure 3:
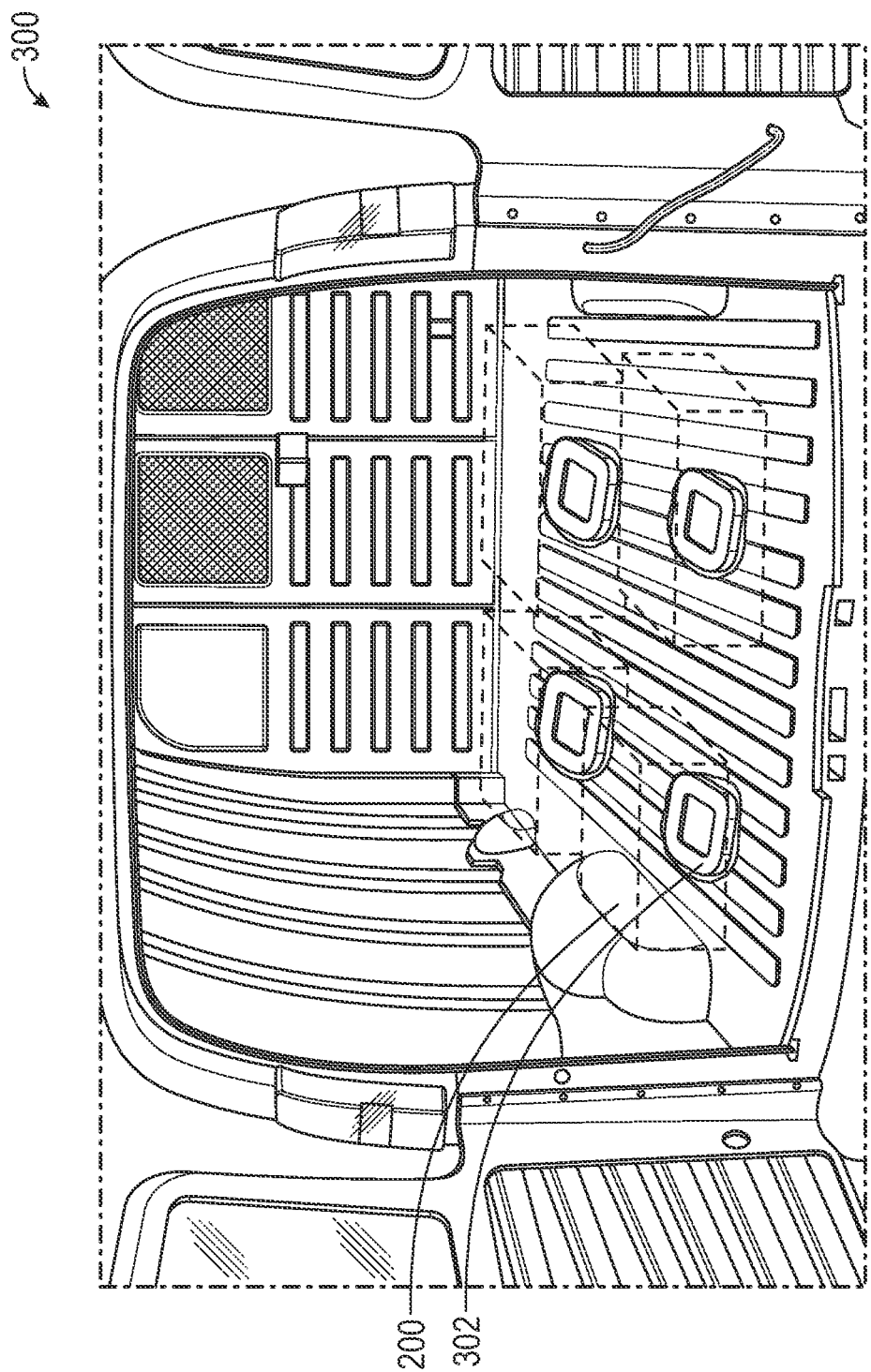
FIG. 3 illustrates a transportation vehicle in accordance with the principles of the present disclosure.

Referring now to FIG. 3, delivery/transportation vehicle 300 is described. Vehicle 300 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, vehicle 300 may be a vehicle having a Level-4 or Level-5 autonomous vehicle controller.

As shown in FIG. 3, vehicle 300 may include one or more external charging sources for charging one or more smart containers via their respective inductive charging modules. Based on which external charging source of vehicle 300 that inductive charging module 210 is operatively coupled to during transit, and/or triangulation via one or more sensors embedded within smart container 200, processor 204 may generate a map of all the smart containers within vehicle 300. Upon arrival at the target destination, processor 204 may transmit the map via communication circuitry 208 to a receiver of customer device 350, such that the customer may determine where in vehicle 300 the correct smart container is located. As described above, status indicator 220 may illuminate a specific color/pattern to indicate that it is the correct smart container for efficient removal from vehicle 300.

Vehicle 300 may include a plurality of holders and/or shelves, each with an external charging source integrated thereon, such that placement of inductive charging module 210 thereon may charge the respective smart container. In one embodiment, smart container 200 may include an inductive power transfer coil on door 203, such that the smart containers may be stacked directly on top of each other while transferring power therebetween, e.g., via inductive charging module 210 of the top smart container and the inductive power transfer coil of the bottom smart container. Moreover, vehicle 300 may include 0.5-1 inch high ridge guide on the floor to allow smart containers to align with external charging sources while still allowing other cargo to be loaded over it. Processor 204 may transmit data to a receiver of vehicle 300 indicative that the smart container has been properly loaded on vehicle 300 and/or removed from vehicle 300. In addition, vehicle 300 may include a plurality of cameras for recording loading/unloading of smart container 200 therein for improved security.

Figure 4:
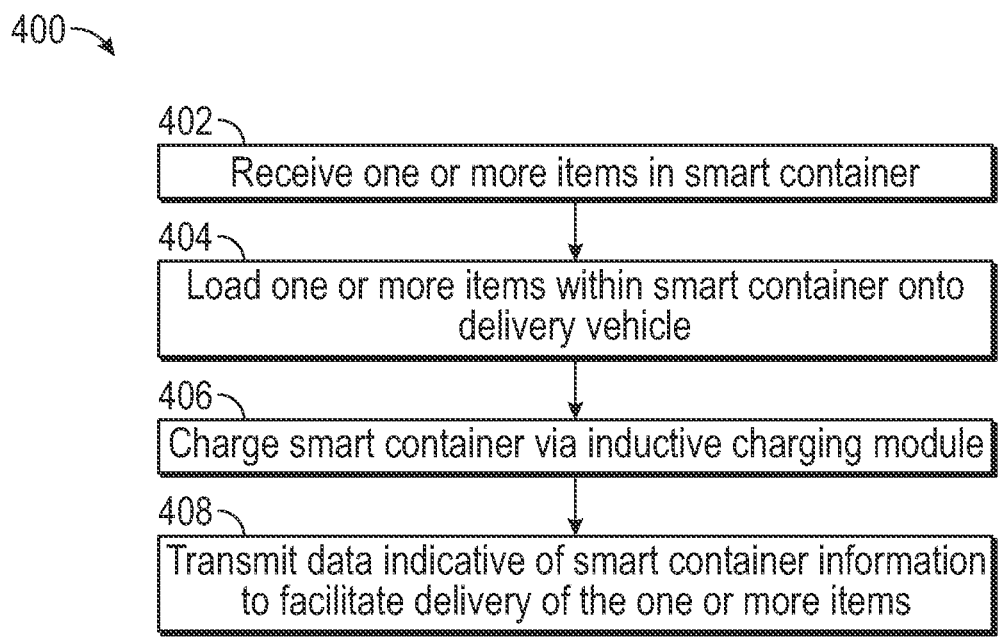
FIG. 4 is a flow chart illustrating exemplary steps for delivering items using a smart container in accordance with the principles of the present disclosure.

Referring now to FIG. 4, exemplary method 400 for delivering items using smart container 200 is described. At step 402, the items to be transported are received in smart container 200, e.g., through the opening of smart container 200 when door 203 is in its open position. Information regarding smart container 200, e.g., smart container content(s), customer name, delivery location, desired temperature range, code for deleting smart container memory, anticipated pickup date, and/or anticipated trip length, and may be transmitted to processor 204, either by manual input or using digital information scanning technology as described above, and stored in memory 206. Accordingly, processor 204 may cause temperature control module 224 to regulate the temperature within smart container 200, based on the desired temperature range and temperature measurements from temperature sensor 222. Upon closing of door 203, lock 214 may be activated to maintain door 203 in its closed position.

Vehicle 300 may receive criteria for where to pick up smart container 200, and additional information such as how many smart containers to load at the pick-up location. As vehicle 300 approaches the pick-up location, vehicle 300 may transmit a notification to a receiver at the pick-location at predetermined time prior to arrival, e.g., 2 minutes before arrival, based on, e.g., speed of vehicle 300, and/or the navigational route of vehicle 300, such that the shipper may prepare for loading smart container 200 onto vehicle 300.

At step 404, smart container 200 may be loaded onto vehicle 300. Smart container 200 may be loaded either manually or automatically into unique holders within vehicle 300 to allow inductive charging module 210 to be operatively coupled to the external charging source. Status indicator 220 may illuminate, or otherwise indicate that inductive charging module 210 is being properly charged via the external charging source. Accordingly, at step 406, during transit, e.g., when smart container 200 is within vehicle 300 and inductive charging module 210 is operatively coupled to the external charging source within vehicle 300, the external charging source will charge smart container 200 via inductive charging module 210. As described above, status indicator 220 may indicate that inductive charging module 210 is being properly charged. Smart container 200 may be charged until battery 212 is fully charged as smart container 200 may have been waiting at the pick-up location, e.g., a dock, for a significant time prior to pick-up. As will be understood by a person ordinarily skilled in the art, smart container 200 need not be positioned on an external charging source, e.g., if charging is not necessary.

At step 408, processor 204 may transmit data indicative of smart container information to, e.g., vehicle 300 and/or customer device 350. For example, processor 204 may transmit data to a receiver of vehicle 300 via communication circuitry 208 indicative that smart container 200 has been properly loaded on vehicle 300. Processor 204 may further transmit data to the receiver of vehicle 300 indicative of the smart container information described above, such as delivery location, etc. Accordingly, processor 204 may communicate with vehicle 300, e.g., a GPS system of vehicle 300, regarding the vehicle's navigational route in order to anticipate any delays in expected delivery date/time. Alternatively or additionally, processor 204 may solely rely on geographical data generated by GPS 226 to determine whether the delivery is on schedule or delayed. Upon determination of an expected delay by processor 204, processor 204 may transmit data to customer device 350 indicative of the delay, e.g., over a cellular network. In addition, processor 204 may transmit data to vehicle 300 indicative of the delay, such that an alert may be communicated to the driver and/or autonomous vehicle to take permissible measures to reduce the delay.

Moreover, processor 204 may transmit data to a receiver of customer device 350 via communication circuitry 208 indicative that smart container 200 has been loaded onto vehicle 200, as well as smart container information such that the customer will know which smart container to remove from vehicle 300 upon arrival at the target destination. Processor 204 may further transmit data to a receiver of customer device 350 via communication circuitry 208 indicative that smart container 200 is approaching the target destination, such that the customer may prepare for the arrival of smart container 200. For example, customer device 350 may be notified that smart container 200 is arriving at a predetermined time prior to arrival, e.g., 2 minutes before arrival, based on, e.g., speed of vehicle 300, current location of smart container 200, and/or the navigational route of vehicle 300. As described above, if vehicle 300 is not at the target destination for smart container 200, and a user attempts to remove smart container 200 from vehicle 300 at the incorrect location, processor 204 may cause status indicator 220 to illuminate in a specific color/pattern to indicate that smart container 200 is being removed at the wrong location. In addition, processor 204 may transmit an alert to vehicle 300 to request that smart container 200 be returned to vehicle, and that the events have been recorded, e.g., via one or more cameras within vehicle 300. In addition, processor 204 may transmit data regarding the same to third parties, e.g., source/shipping party, destination/receiving party, transit/delivery service, and/or arbitration/ledger services. Additionally, as smart container 200 approaches the target destination, processor 204 may cause status indicator 220 to illuminate in a specific color/pattern to indicate that smart container 200 is ready to be unloaded from vehicle 300.

Upon receipt of smart container 200 by the recipient/customer, lock 214 may be deactivated upon receipt of an unlock code by processor 204 via GUI 218. For example, the customer may directly input the unlock code into GUI 218 on smart container 200, or the customer may input the unlock code through, e.g., an application on customer device 350 that communicates with processor 204 via communication circuitry 208. Alternatively, the unlock code may be inputted via vehicle 300, e.g., manually by the driver if there is one, or processor 204 may automatically deactivate lock 214 if it determines that smart container 200 is in the correct destination based on GPS 226. In addition, the customer may input a code to delete the smart container information stored on memory 212 for a given shipment. Processor 212 may compare the code inputted with the delete code previously stored within memory 212 for a given shipment. This may clear up space on memory 212, as well as protect customer data. In one embodiment, the delete code may be inputted prior to opening door 203 so as to allow door 203 to be opened without transmitting a tampering signal.

Moreover, the customer may load empty smart containers, e.g., from a previous delivery, onto vehicle 300 so that they may be charged, and returned to the same or a different pick-up location to be re-filled within additional items for delivery. System 100 may use public transaction ledger framework for traceability and tampering resistance, e.g., timestamps, previous blockchain information, transaction data etc. A blockchain in this application may be generally described as a growing list of records, called blocks, which are linked using cryptography. Each block contains a cryptographic hash of the previous block, a timestamp, and transaction data. By design, a blockchain is resistant to modification of the data and allows recording of events in a verifiable and permanent manner. In addition, information regarding contents of shipments, target destinations, and frequency of a type of shipment may be stored in memory 206, or otherwise stored in a cloud server, for subsequent upload to create new opportunities for tuning the logistics network.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A smart container comprising:
   a body configured to store one or more items, the body comprising an opening and a door configured to transition between an open position and a closed position;
   one or more sensors;
   an inductive charging module configured to be charged via an external charging source and to power the smart container;
   communication circuitry configured to communicate with one or more receivers; and
   a computing device comprising a processor and a memory having computer executable instructions that, when executed by the processor, cause the processor to:
     transmit data indicative of smart container information to at least one of the one or more receivers via the communication circuitry to facilitate delivery of the one or more items,
   wherein one of the one or more receivers is integrated with a customer device, and
   wherein the processor is configured to transmit data indicative of smart container information to the customer device, the smart container information comprising a map including a location of the smart container within a delivery vehicle to facilitate delivery of the one or more items.

2. The smart container of claim 1, wherein one of the one or more sensors comprises a temperature sensor configured to measure temperature within the smart container, the smart container further comprising a temperature control module operatively coupled to the computing device, and wherein the processor is configured to control temperature within the smart container via the temperature control module based on the temperature measurements and a desired temperature range stored in a memory of the processor.

3. The smart container of claim 1, wherein one of the one or more sensors comprises a door sensor operatively coupled to the door, and wherein the processor is configured to generate an alarm if the door sensor detects that the door is tampered with.

4. The smart container of claim 1, wherein the communication circuitry is configured to communicate with one or more receivers via a Bluetooth connection.

5. The smart container of claim 1, wherein one of the one or more receivers is integrated with an autonomous vehicle.

6. The smart container of claim 5, wherein the processor is configured to transmit data indicative of smart container information to the autonomous vehicle, the smart container information comprising information that the smart container is properly loaded on the autonomous vehicle.

7. The smart container of claim 1, wherein the processor is configured to transmit an alert to the customer device, the alert indicative of an approaching delivery.

8. The smart container of claim 1, wherein the processor is configured to receive smart container information comprising at least one of contents, customer name, delivery location, desired temperature range, code for deleting smart container memory, anticipated pickup date, or anticipated trip length.

9. The smart container of claim 8, wherein the processor is configured to delete the received smart container information upon receipt of a code via a graphical user interface coupled to the smart container.

10. The smart container of claim 1, further comprising a lock configured to maintain the door in the closed position when activated, and wherein the processor is configured to deactivate the lock upon receipt of an unlock code via a graphical user interface operatively coupled to the smart container.

11. The smart container of claim 1, further comprising a status indicator configured to indicate status of the smart container, the status comprising at least one of a charge level of the smart container, when the inductive charging module is being charged by the external charging source, when the smart container is within a predetermined proximity to a destination, or if the smart container is being removed from a delivery vehicle at an incorrect destination.

12. The smart container of claim 1, further comprising a GPS system configured to determine a geographical location of the smart container.

13. The smart container of claim 1, further comprising a battery configured to power the smart container when the inductive charging module is not being charged via the external charging source.

14. A method for delivering one or more items using a smart container, the method comprising:

receiving the one or more items in the smart container;
loading the one or more items within the smart container onto a delivery vehicle;
charging the smart container via an inductive charging module of the smart container and an external charging source of the delivery vehicle; and
transmitting data indicative of smart container information to a receiver to facilitate delivery of the one or more items,
wherein transmitting data indicative of smart container information to the receiver comprises transmitting data indicative of smart container information to a customer device, the smart container information comprising a map including a location of the smart container within the delivery vehicle to facilitate delivery of the one or more items.

15. The method of claim 14, further comprising:
receiving a desired temperature range associated with the one or more items;
sensing temperature within the smart container via one or more sensors; and
controlling temperature within the smart container based on the sensed temperature and the desired temperature range.

16. The method of claim 14, further comprising:
receiving smart container information comprising at least one of contents, customer name, delivery location, desired temperature range, anticipated pickup date, or anticipated trip length; and
deleting the received smart container information upon receipt of a code via a graphical user interface operatively coupled to the smart container.

17. The method of claim 14, wherein the smart container comprises a door sensor operatively coupled to a door of the smart container, the method further comprising generating an alarm if the door sensor detects that the door is tampered with.

* * * * *